United States Patent [19]

Kurahayashi

[11] 4,449,895
[45] May 22, 1984

[54] REFRIGERANT COMPRESSOR

[75] Inventor: Takahisa Kurahayashi, Fujisawa, Japan

[73] Assignee: Matsushita Reiki Co., Ltd., Osaka, Japan

[21] Appl. No.: 333,063

[22] Filed: Dec. 21, 1981

[30] Foreign Application Priority Data

Dec. 23, 1980 [JP] Japan .......................... 55-186118[U]
Mar. 6, 1981 [JP] Japan ................................ 56-32787
Mar. 6, 1981 [JP] Japan ................................ 56-32788

[51] Int. Cl.³ ...................... F04B 39/02; F04B 35/04; F04D 29/28; F16N 13/20
[52] U.S. Cl. ............................... 417/368; 417/423 R; 417/902; 415/73; 184/6.16; 184/31
[58] Field of Search ............... 417/366, 368, 372, 410, 417/424, 902, 423 R; 184/6.16, 26, 31; 415/73, 72

[56] References Cited

U.S. PATENT DOCUMENTS

| 1,711,193 | 4/1929 | Wunderlich | 417/423 R |
| 2,246,868 | 6/1941 | Trask | 417/372 |
| 2,669,384 | 2/1954 | Dills . | |
| 3,173,584 | 3/1965 | Giavasis | 417/424 |
| 3,317,123 | 5/1967 | Funke . | |
| 3,465,953 | 9/1969 | Shaw | 417/368 |
| 3,880,548 | 4/1975 | Kirby, Jr. | 198/659 |

Primary Examiner—William L. Freeh
Assistant Examiner—Paul F. Neils
Attorney, Agent, or Firm—Stevens, Davis, Miller & Mosher

[57] ABSTRACT

A refrigerant compressor suitable for use in refrigerators, air conditioners, heat pumps or the like apparatus. The refrigerant compressor has a closed casing which encases a driving electric motor section and a compressor section constructed as a unit. The compressor section has a substantially horizontal crank shaft consisting of a main shaft portion fixed to one end of the rotor of the driving motor, an eccentric portion rotatably carrying a rotary piston and an end journal portion. The lubrication system of this compressor has a passage means for introducing a lubricating oil to various parts requiring lubrication, and a lubricator adapted to supply the lubrication oil to the passage means. The passage means includes a peripheral oil groove formed in the portion having crank shaft of the minimum eccentricity and connected at its one end to a peripheral oil groove formed in the main shaft portion and at its other end to a peripheral oil groove in the journal portion of the crank shaft. The lubricator includes a curved oil pipe fixed at its one end and immersed at its other end in the lubricating oil collected in the closed casing, and a coiled spring rotatably received by the oil pipe and connected at its one end to the journal portion of the crank shaft while the other end is immersed in the lubricating oil through the end opening of the oil pipe.

14 Claims, 7 Drawing Figures

REFRIGERANT COMPRESSOR

BACKGROUND OF THE INVENTION

1. Field of the Invention

The present invention relates to a refrigerant compressor for use in electric refrigerators, air conditioners, heat pumps or the like apparatus.

2. Description of the Prior Art

The refrigerant compressor of the type mentioned above usually has a closed casing accommodating a compressor section and a driving motor section constructed as a unit with each other. In operation, the lubricating oil collected at a lower portion of the closed casing is sucked up and forcibly supplied by a lubricating system to various rotating and sliding parts such as crank shaft, bearings and so forth to ensure a smooth compression of the refrigerant.

For instance, U.S. Pat. No. 3,317,123 issued to L. F. FUNKE proposes a refrigerant compressor in which the lubricating oil supplied by the lubrication system is introduced to the portions of the compressor requiring lubrication, through an oil passage formed in the crank shaft and then through branching passages communicating with the oil passage formed in the crank shaft. In this type of lubrication system, the lubrication oil comes up to the eccentric portion of the crank shaft by the action of the centrifugal force and then forcible charged to the main shaft portion of the crank shaft corresponding to the electric motor. It is quite difficult to forcibly charge the lubricating oil from the eccentric shaft portion to the main shaft portion from the eccentric shaft portion, because the centrifugal force in this case acts to resist to the flow of the lubricating oil. This problem is serious particularly when the lubricating oil contains gaseous refrigerant.

The U.S. Pat. No. 2,669,384 issued to R. L. DILLS proposes a lubricating system having an oil groove formed in the outer peripheral surface of the crank shaft, so that the lubricating oil supplied by the lubricator is introduced through the oil groove to the portions of the compressor requiring lubrication. In this lubrication system, the oil groove has to have a quite long length. A considerable labour and cost are required for machining such a long oil groove.

In these known refrigerant compressor, it is necessary to use a lubricator capable of delivering the lubricant at a sufficiently high pressure and large flow rate, for otherwise it is not possible to supply the lubricant to the portions requiring lubrication through the oil passage or oil groove.

SUMMARY OF THE INVENTION

Accordingly, an object of the invention is to provide a refrigerant compressor having an improved oil groove formed in the crank shaft of the compressor, so as to ensure the smooth supply of the lubricating oil to the portion requiring lubrication without substantial resistance, thereby to eliminate seizure and wear attributable to the shortage of the lubricating oil.

Another object of the invention is to provide a refrigerant compressor in which the lubrication oil is smoothly guided along the crank shaft, so that the lubrication is achieved by a simple lubricator.

The above and other objects, features and advantages of the invention will become clear from the following description of the preferred embodiments taken in conjunction with the accompanying drawings.

DESCRIPTION OF THE PREFERRED EMBODIMENTS

Figure 1:
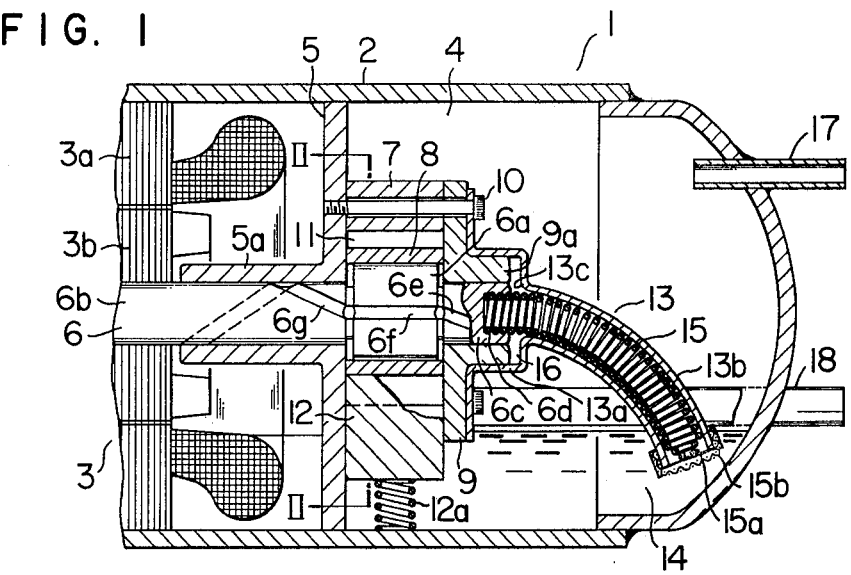
FIG. 1 is a sectional view of a refrigerant compressor constructed in accordance with an embodiment of the invention.
Figure 2:
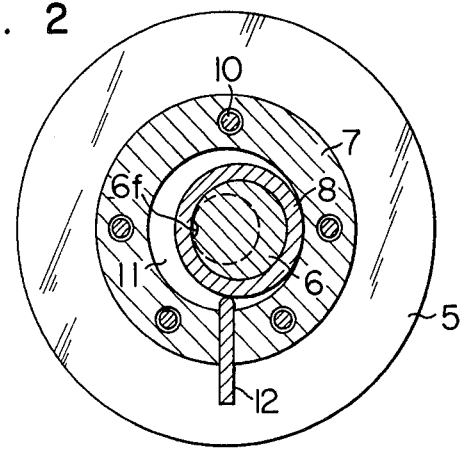
FIG. 2 is a sectional view taken along the line II—II of FIG. 1.

Referring first to FIG. 1 showing a refrigerant compressor constructed in accordance with a first embodiment of the invention, the refrigerant compressor generally designated at a reference numeral 1 has a closed casing 2 which encases an electric motor section 3 and a rotary compressor section 4 constructed as a unit. The motor section 3 has a stator 3a fixed in the closed casing 2 and a rotor 3b. A crank shaft 6 is supported by a main bearing 5a integral with a side plate 5 which is fitted lightly into the closed casing 2 and then fixed to the same by welding or the like.

The crank shaft 6 has a journal portion 6c, eccentric portion 6a and a main shaft portion 6b formed in one body. The eccentric portion 6a of the crank shaft carries a rotary piston 8 which is received by a cylinder plate 7. The journal portion 6c of the crank shaft 6 is supported by a bearing 9a integral with another side plate 9. Thus, the crank shaft 6 is rotatably supported at its main shaft portion 6b by the main bearing 5a on the side plate 5 and at its journal portion 6c by the bearing 9a on the other side plate 9. The crank shaft 6 is fitted tightly at its one end into the rotor 3b of the electric motor section 3.

Figure 3:
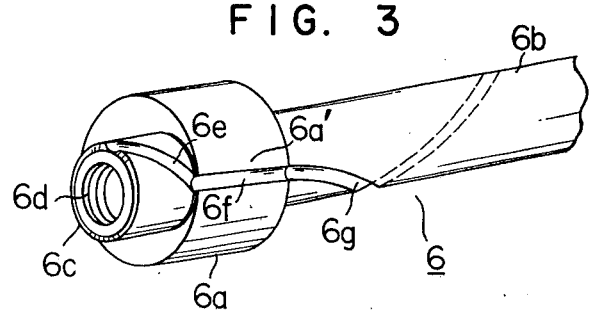
FIG. 3 is a perspective view of a crank shaft of the compressor as shown in FIG. 1.

The side plate 5, cylinder plate 7 and the side plate 9 are integrated by means of tie bolts 10 to cooperate in defining a compression chamber 11. The space in the compression chamber 11 divided into a high pressure side and low pressure side by means of a vane 12 which is resiliently biased by a vane spring 12a. Reference numeral 13 denotes a spring guide fastened to the bearing 9a by means of the tie bolts 10. The spring guide 13 has an attaching base 13a fitting around the bearing portion 9a and a downwardly bent oil pipe 13b. The upper end of the oil pipe 13b is connected to the attaching base portion 13a such that the bore of the oil pipe 13b opens through an opening 3c formed in the attaching base 13a coaxially with the crank shaft 6, while the lower end of the oil pipe 13b is immersed in the lubricating oil 14 collected in a lower portion of the closed casing 2. A coiled spring 15 is received by the oil pipe 13b. The upper end of the coiled spring 15 is screwed into a threaded bore 6d formed in the end of the crank shaft 6 through the opening 13c, while the lower end of the coiled spring is immersed in the lubricating oil 14 through the lower opening of the oil pipe 13b. The diameter of the lower end portion of the coiled spring 15 is gradually reduced to provide a slightly frustoconical restriction portion 15a. Reference numeral 15b designates a filter fitted around and fixed to the end portion of the oil pipe 13b. Reference numeral 16 designates an oil pressure chamber defined by the attaching base 13a of the spring guide 13 and the end surface of the crank shaft 6. The crank shaft 6, journal portion 6c, eccentric portion 6a and the main shaft portion 6b are provided with peripheral oil grooves 6e, 6f and 6g, respectively. As will be clearly seen from FIG. 3, the oil groove 6f in the eccentric portion 6a is formed in the portion 6a' of the smallest eccentricity so as to extend in the axial direction of the crank shaft, while the oil grooves 6e and 6g in the journal portion 6c and main shaft portion 6b extend spirally. The terminating end of the oil groove 6g in the main shaft portion 6b is connected to one end of the oil groove 6f in the eccentric portion, while the other end of the oil groove 6f is connected to the starting end of the oil groove 6e in the journal portion 6c.

In operation, as the rotor 3b is rotated as a result of the supply of an electric power to the electric motor section 3, the crank 6 and, hence, the rotary piston 8 are rotated to induce the refrigerant gas into the compression chamber 11 through a suction pipe 18 and to compress the refrigerant gas in the compression chamber 11. The compressed refrigerant is discharged through a delivery valve (not shown) and, after temporarily staying in the closed casing 2, forwarded to the refrigeration cycle through a discharge pipe 17.

The rotation of the crank shaft 6 causes a rotation of the coiled spring 15 in the oil pipe 13b. As a result of this rotation, the lubricating oil 14 is sucked due to the lead of the coiled spring 15, through the annular passage formed between the coiled spring 15 and the inner peripheral surface of the oil pipe 13b into the oil pressure chamber 16.

The oil in the oil pressure chamber 16 is then moved due to its viscosity along the spiral oil groove 6e in the journal portion 6c to reach the oil groove 6f of the eccentric portion 6a and then flows into the oil groove 6g of the main shaft portion 6b of the crank shaft 6. Since the oil groove 6f is formed in the portion 6a' of minimum eccentricity, the distance of movement of oil in the normal or radial direction, at the juncture between the oil groove 6e of the journal portion 6c and the oil groove 6f of the eccentric portion 6a, is sufficiently small. For the same reason, the distance of movement of oil in the normal or radial direction, at the juncture between the oil groove 6f of the eccentric portion 6a and the oil groove 6g in the main shaft portion 6b, is made sufficiently small, so that the oil flowing through this juncture encounters only a small resistance caused by the centrifugal force. It is, therefore, possible to obtain a smooth and steady flow of the lubricating oil along these oil grooves 6e, 6f and 6g.

In addition, since the oil grooves 6e, 6f and 6g are continuous, the refrigerant gas which has happened to come into the oil grooves during suspension of operation of the compressor can be relieved easily together with the oil.

To explain in more detail, when the compressor is not operating, the lubrication oil in the oil pipe 13b, oil pressure chamber 16 and the oil grooves 6e, 6f, 6g flow out due to the force of gravity or by the movement of the gaseous refrigerant for achieving an equilibrium of the pressure, so that the lubricating oil in these parts is partially replaced with the refrigerant gas. In other words, bubbles of the refrigerant gas are contained by the lubricating oil staying in the lubricating oil passage.

Then, as the compressor starts to operate, the oil pressure in the oil pressure chamber 16 is increased so that the oil is forwarded to the oil groove 6e. Since the passage of the oil has only a small portion in which the oil has to flow resisting to the centrifugal force, the oil can effectively force out the bubbles of the refrigerant gas as the oil flows along the oil grooves, even when the oil pressure is comparatively low.

Figure 4:
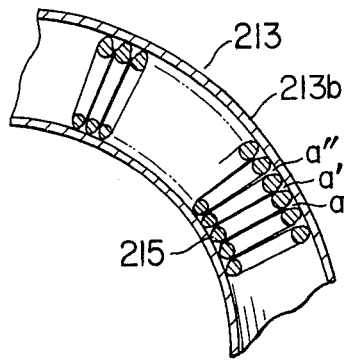
FIG. 4 is a partial sectional view of a refrigerant compressor constructed in accordance with a second embodiment of the invention.
Figure 5:
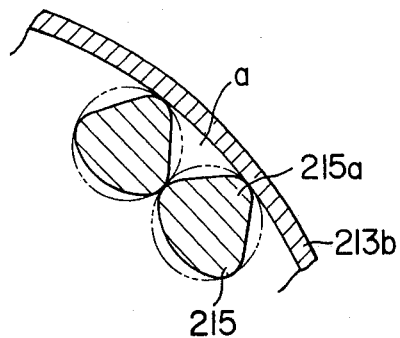
FIG. 5 is an enlarged sectional view of an essential part of the refrigerant compressor as shown in FIG. 4.

FIGS. 4 and 5 show a refrigerant compressor in accordance with a second embodiment of the invention which is discriminated from the first embodiment by the following features.

Reference numeral 213 denotes a spring guide having an oil pipe 213b which receives a coiled spring 215. As in the case of the first embodiment, the coiled spring is screwed at its one end into a threaded bore 6d formed in the end surface of the crank shaft 6, so that the coiled spring 15 rotates in accordance with the rotation of the crank shaft 6.

As will be best seen from FIG. 5, the coiled spring 215 is formed from a non-circular wire having a substantially trapezoidal cross-sectional shape. Therefore, the volume of the space a, a', a" formed between the inner peripheral surface of the oil pipe 213b and the adjacent turns of the coiled spring 15 can be increased as compared with the case where, as shown by two-dots-and-dash line in FIG. 5, the wire of the coiled spring has a circular cross-section. In consequence, in this embodiment, it is possible to obtain a greater rate of supply of oil as compared with the first embodiment in which the coiled spring 15 is formed of a wire having a circular cross-section.

This specific cross-sectional shape of the wire of the coiled spring 215 offers also the following advantage. Namely, the cross-sectional area of the wire can be much reduced as compared with the case where the wire has a circular cross-section, for obtaining the same volume of the spaces a, a', a". This means that the lateral rigidity of the coiled spring itself can be reduced sufficiently so that the coiled spring can be used satisfactorily with an oil pipe having a greater curvature without incurring any substantial increase of the electric power input to the motor which may, otherwise, be caused by the high rigidity of coil.

Figure 6:
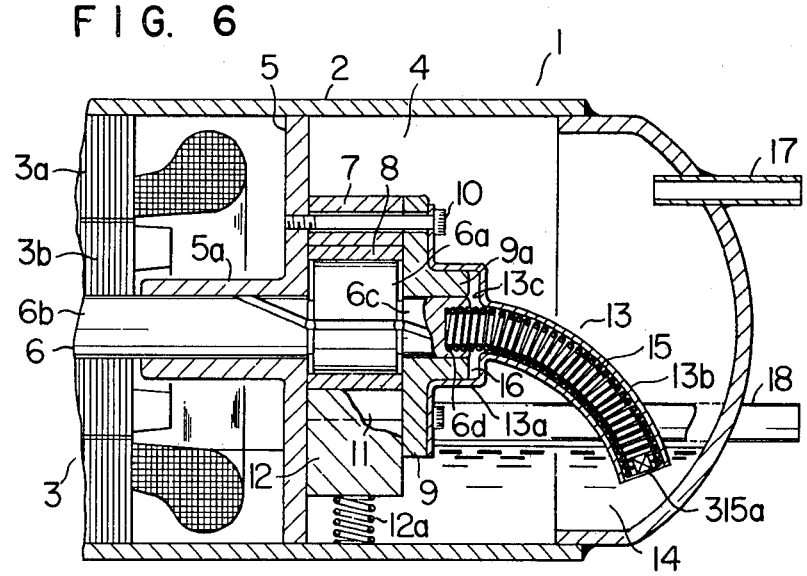
FIG. 6 is a sectional view of a refrigerant compressor constructed in accordance with a third embodiment of the invention.
Figure 7:
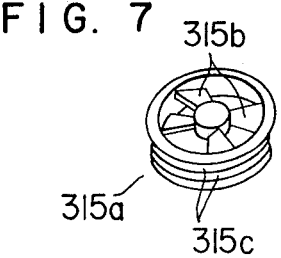
FIG. 7 is a perspective view of an auxiliary pump incorporated in the embodiment shown in FIG. 6.

FIGS. 6 and 7 in combination show a third embodiment of the invention. In order to simplify the explanation, the parts or members common to those in the first embodiment, designated at the same reference numerals, are not described.

This third embodiment is discriminated from the first embodiment by the following features. Namely, in this embodiment, an auxiliary pump 315a as shown in FIG. 7 is attached to the end of the coiled spring 15. The auxiliary pump 315a has a generally ring-like form with a plurality of radial vanes 315b and a screw thread groove 315c formed in the outer peripheral surface. The auxiliary pump 315a is screwed into and fixed to the coiled spring 15.

In this construction, as the crank shaft 6 is rotated by means of the electric motor section 3, the auxiliary pump 315a is rotated together with the coiled spring 15. In consequence, the radial vanes 315b of the auxiliary pump 315a positively induce the lubricating oil 14, so that the oil ascends along the inner peripheral surface of the oil pipe 13b due to the lead of the coiled spring 15 into the oil pressure chamber 16. Thus, the rate of supply of the lubricating oil is increased by the presence of the auxiliary pump 315a.

Although the invention has been described through specific forms, the embodiments described heretofore are not exclusive and various changes and modifications may be imparted thereto without departing from the spirit and scope of the invention which are limited solely by the appended claims.

What is claimed is:

1. A refrigerant compressor comprising:
   a closed casing;
   a compressor section and an electric motor section adapted for driving the compressor section, said compressor section and said electric motor section are encased by the closed casing; and a crank shaft having a main shaft portion fixed to the rotor of said electric motor section, an eccentric portion for driving said compressor section and an end journal portion, said main shaft portion being supported by a main bearing while said journal portion is supported by a bearing, said eccentric portion of said crank shaft being provided at its portion of minimum eccentricity with a peripheral oil groove extending substantially parallel to the axis of the crankshaft and which is communicated at its one end with an oil groove formed in the peripheral surface of said main shaft portion and at its other end with an oil groove formed in the peripheral surface of said journal portion.

2. A refrigerant compressor as claimed in claim 1, wherein said main bearing and said bearing are formed as a unit with idle plates closing both ends of a cylinder plate, while said eccentric portion of said crank shaft carries a rotary piston housed by said cylinder plate.

3. A refrigerant compressor as claimed in claim 1, wherein said crank shaft is held substantially horizontally.

4. A refrigerant compressor as claimed in claim 1, characterized by further comprising a lubricator adapted to suck a lubricating oil collected in said closed casing and to supply the same to said oil groove in said journal portion of said crank shaft.

5. A refrigerant compressor as claimed in claim 4, wherein said lubricator includes an oil pipe fixed at its one end while the other end is immersed in the lubricating oil, and a coiled spring rotatably received by said oil pipe and having a surface positioned in close proximity to the inner peripheral surface of said oil pipe, said coiled spring being fixed at its one end to said journal portion of said crank shaft while the other end is immersed in said lubricating oil, said coiled spring consisting of a wire wound in a spiral form in such a manner that the adjacent turns of said wire closely contact with each other.

6. A refrigerant compressor as claimed in claim 4, wherein said lubricator includes a spring guide having an attaching base having an opening substantially coaxial with said crank shaft and an oil pipe connected to said attaching base such that the bore of said oil pipe communicates with said opening in said attaching base, said oil pipe having a free end immersed in the lubricating oil collected in said closed casing, and a closely coiled coil spring rotatably received by said oil pipe, said coiled spring being connected at its one end to said journal portion of said crank shaft with the other end being immersed in said lubricating oil through an end opening of the free end of said oil pipe.

7. A refrigerant compressor as claimed in claim 6, wherein said oil pipe is bent in a curvilinear form.

8. A refrigerant compressor as claimed in claim 4, wherein said lubricator includes an oil pipe fixed at its one end while the other end is immersed in the lubricating oil, and a coiled spring rotatably received by said oil pipe, said coiled spring being fixed at its one end to said journal portion of said crank shaft while the other end is immersed in said lubricating oil, said coiled spring being formed of a wire having a non-circular cross-section.

9. A refrigerator compressor as claimed in claim 8, wherein said crank shaft is supported substantially horizontally while said oil pipe is bent in a curvilinear form.

10. A refrigerator compressor as claimed in claim 4, wherein said lubricator includes an oil pipe fixed at its one end while the other end is immersed in the lubricating oil collected in said closed casing, a coiled spring rotatably received by said oil pipe and fixed at its one end to said journal portion of said crank shaft while the other end is immersed in said lubricating oil, and an auxiliary pump having flow inducing means and fixed to said end of said coiled spring immersed in said lubricating oil.

11. A refrigerant compressor as claimed in claim 10, wherein said crank shaft is held substantially horizontally, while said oil pipe is bent in a curvilinear form.

12. A refrigerant compressor as claimed in claim 10, wherein said auxiliary pump has an annular body with an outer diameter approximately equal to the inner diameter of said coiled spring and an inner passage having a plurality of vanes for inducing oil flow into said coiled spring as it rotates.

13. A refrigerator compressor as claimed in claim 12, in which said outer diameter is threaded to engage the inner surface of said coiled spring.

14. A refrigerant compressor comprising:
   a closed casing having a barrel portion and lid portions and confining therein a lubricating oil;
   a compressor section mounted in said closed casing and including a cylinder plate, side plates closing both ends of the cylinder plate and defining a compressor chamber and a piston housed by said compression chamber and adapted to rotate along the inner surface of said cylinder plate;
   an electric motor section mounted in said closed casing and adapted to drive said compressor section;
   a substantially horizontal crank shaft having a main shaft portion fixed to the rotor of said motor section, an eccentric portion adapted for rotatively driving said rotary piston and an end journal portion, said main shaft portion and said journal portion being supported by a main bearing and a bearing formed on said side plates; and
   a lubricator including an oil pipe bent at its intermediate portion in a curvilinear form and fixed at its one end through an attaching base to one of said side plates while the other end is immersed in said lubricating oil, and a coiled spring having adjacent turns closely contacting each other and rotatably received by said oil pipe, said coiled spring being fixed at its one end to said journal portion of said crank shaft while the other end is immersed in said lubricating oil;
   said eccentric portion of said crank shaft having a peripheral oil groove extending substantially parallel to the axis of the crankshaft in its portion of minimum eccentricity and connected at its one end to a peripheral oil groove formed in said main shaft portion of said crank shaft and at its other end to a peripheral oil groove formed in said journal portion of said crank shaft.

* * * * *